US005446241A

United States Patent [19]

Mackaness et al.

[11] Patent Number: 5,446,241

[45] Date of Patent: Aug. 29, 1995

[54] APPARATUS AND METHOD FOR TWIST CONNECTING WIRES

[76] Inventors: James B. Mackaness, 28 The Crescent; Shirley R. Puchy, 30 The Crescent, both of Cheltenham, New South Wales, 2119, Australia

[21] Appl. No.: 38,971

[22] Filed: Mar. 29, 1993

Related U.S. Application Data

[63] Continuation-in-part of Ser. No. 807,833, Jan. 16, 1992, abandoned.

[30] Foreign Application Priority Data

May 23, 1990 [AU] Australia .............................. PK0289

[51] Int. Cl.[6] ........................ H01R 4/10; H01R 11/00; H02G 15/08

[52] U.S. Cl. ....................................... 174/91; 174/845; 174/87; 403/214; 403/391

[58] Field of Search ............... 174/91, 87, 84 R, 84 S; 403/214, 391, 396

[56] References Cited

U.S. PATENT DOCUMENTS

| | | | |
|---|---|---|---|
| 1,196,792 | 9/1916 | Leahey | 403/214 |
| 1,263,050 | 4/1918 | Fargo | 174/91 |
| 1,539,723 | 5/1925 | Deuscher | 403/214 |
| 1,657,933 | 1/1928 | Lindsley | 174/84 S |
| 1,763,298 | 6/1930 | Franzen | 174/94 R |
| 2,526,740 | 10/1950 | Gilmore | 174/84 R |
| 4,107,453 | 8/1987 | Erixon | 174/87 |
| 4,163,868 | 8/1979 | Stotts | 174/87 |
| 4,874,909 | 10/1989 | Velke, Sr. et al. | 174/84 S |
| 5,023,402 | 6/1991 | King, Jr. et al. | 174/87 |
| 5,151,239 | 9/1992 | King, Jr. | 174/87 |
| 5,228,875 | 7/1993 | Swenson, Sr. | 439/784 |

FOREIGN PATENT DOCUMENTS

| | | | |
|---|---|---|---|
| 203253 | 3/1986 | European Pat. Off. . | |
| 2173493 | 9/1973 | France . | |
| 13910 | 6/1969 | Japan | 174/84 S |

*Primary Examiner*—Morris Nimmo

*Attorney, Agent, or Firm*—Edwin D. Schindler

[57] ABSTRACT

A two member connector to twist connect two ductile wires, releasable coupling means is provided to couple inner ends of the members together, each member has a cavity means including a pair of transversely spaced wire chambers each sized to accept a wire to be joined, the cavity means of at least one member includes a central chamber disposed between the wire chambers of that member and sized to accept two wires when twist connected, a slot connects the central chamber with each of its associated wire chambers and the sides of the slots provide brake surface means; to form a twist connection the two wires are housed in the wire chambers of both members and the members are contra-rotated to bring torque applying and reaction shoulders of each cavity means into contact with the wires to force the wires together and twist connect them, in the formation of the twist connection the wires in the member with the central chamber are drawn into the central chamber from the wire chambers over the brake surface means which applies a braking effect to the wire movement.

16 Claims, 11 Drawing Sheets

APPARATUS AND METHOD FOR TWIST CONNECTING WIRES

This application is a continuation-in-part of application Ser. No. 07/807,833, filed Jan. 16, 1992 now abandoned.

This invention relates to the joining together of two elongated ductile elements (hereinafter called wires) by means of an interlocked double helical twist connection between the wires.

The invention has particular relevance to joining the conductive cores of insulated electrical cables, which are to be considered as falling within the term "wires" as used hereinafter.

It is known manually to twist connect the ends of two or more wires to form a dead end connection or an inline connection. When making manual connections tools such as pliers are usually used by tradesmen and handymen to grip the ends of the wires, frequently two pairs of pliers are required with one being used to apply twisting torque and the other to resist the applied torque. However, manually formed twist connections are frequently poor connections because of the difficulty in applying sufficient pressure manually to make the connection tight. Frequently the result of manual efforts is one wire twisted around another which is a poor form of connection.

Another drawback with the use of hand tools as discussed above is that lack of care in the formation of the joint can result in severe metal deformation and undesirable wire stress during the formation of the connection. The ideal connection is one where the wires are both in the form of a helix and the helixes are tightly interlocked and the wires are free from excessive deformation and stress.

Multi-part manually operated devices where the parts support wires to be connected and the connection is formed by relative rotation between the device parts are known, see for example U.S. Pat. Nos. 1,763,298, 1,196,792 and 1,657,933.

This invention is concerned with a method and apparatus for forming twist connections of the interlocked double helix type similar to that disclosed in the above prior art but includes method steps and apparatus features not disclosed in the prior art.

In conceptual terms the method of the invention comprises positioning wires to be joined in side by side spaced relationship in two members and then applying a twisting torque to the wires by means of relative rotational motion of the members to cause the wires to cross and to be forced into engagement and to apply a brake against relative linear movement of the wires during the formation of the connection resulting in a tight twist connection comprised of two interlocked helixes.

The connector for carrying out the method conceptually comprises two members with cavity means in each member where the wires to be joined lie in spaced side by side relationship and in operative relationship with torque applying and torque resisting shoulder means to engage each wire separately, engagement between the wires and the shoulder means converts relative rotational movement of the members into a twisting torque acting on the wires to from them into interlocked helixes, and there is means to apply a brake against relative linear movement of the wires during the application of the twisting torque. The term "brake" means a retarding force.

The formation of a connection between the cores of two insulated wires involves the removal of the insulation to reveal the cores. Insulation strippers need to be available in such circumstances. One of the forms of connector provided by this invention overcomes the need for such tools by providing a wire stripper as an integral part of the connector.

Two presently preferred forms of connector to carry out the method of the invention will now be described in detail with reference to the accompanying drawings in which.

Figure 1:
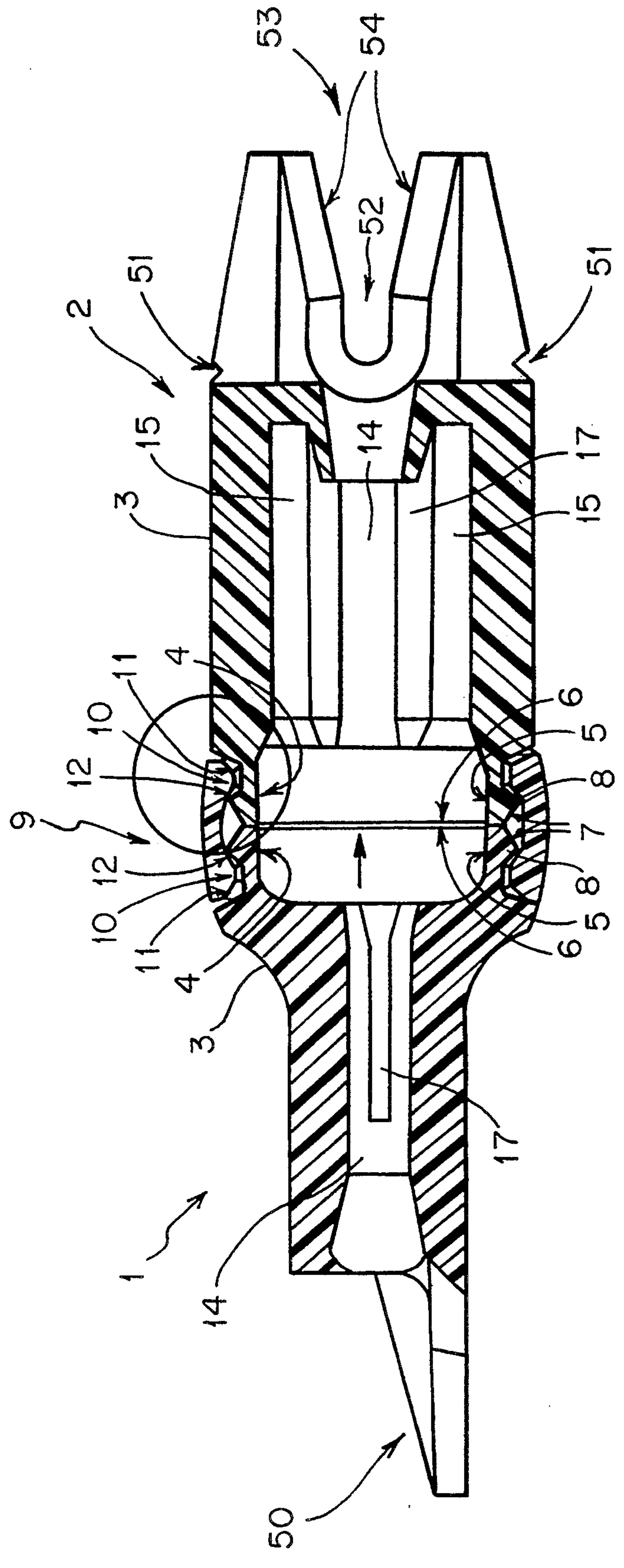
FIG. 1 is a half-section elevation of an assembled in-line type connector according to the invention, the lines of section are indicated 1—1 on FIG. 2.
Figure 4:
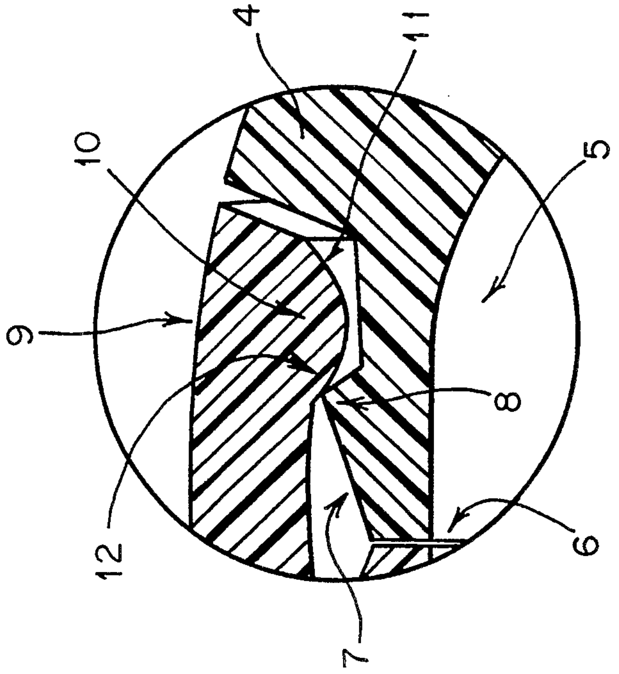
Figure 3:
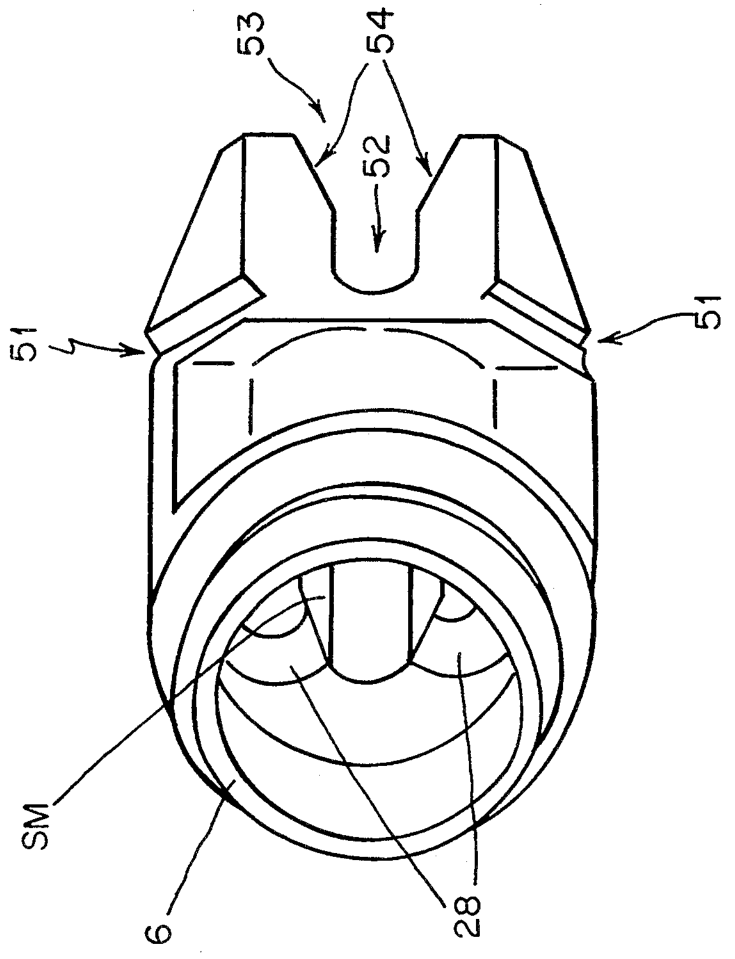
FIG. 3 is a perspective view of the member of FIG. 2.
Figure 5:
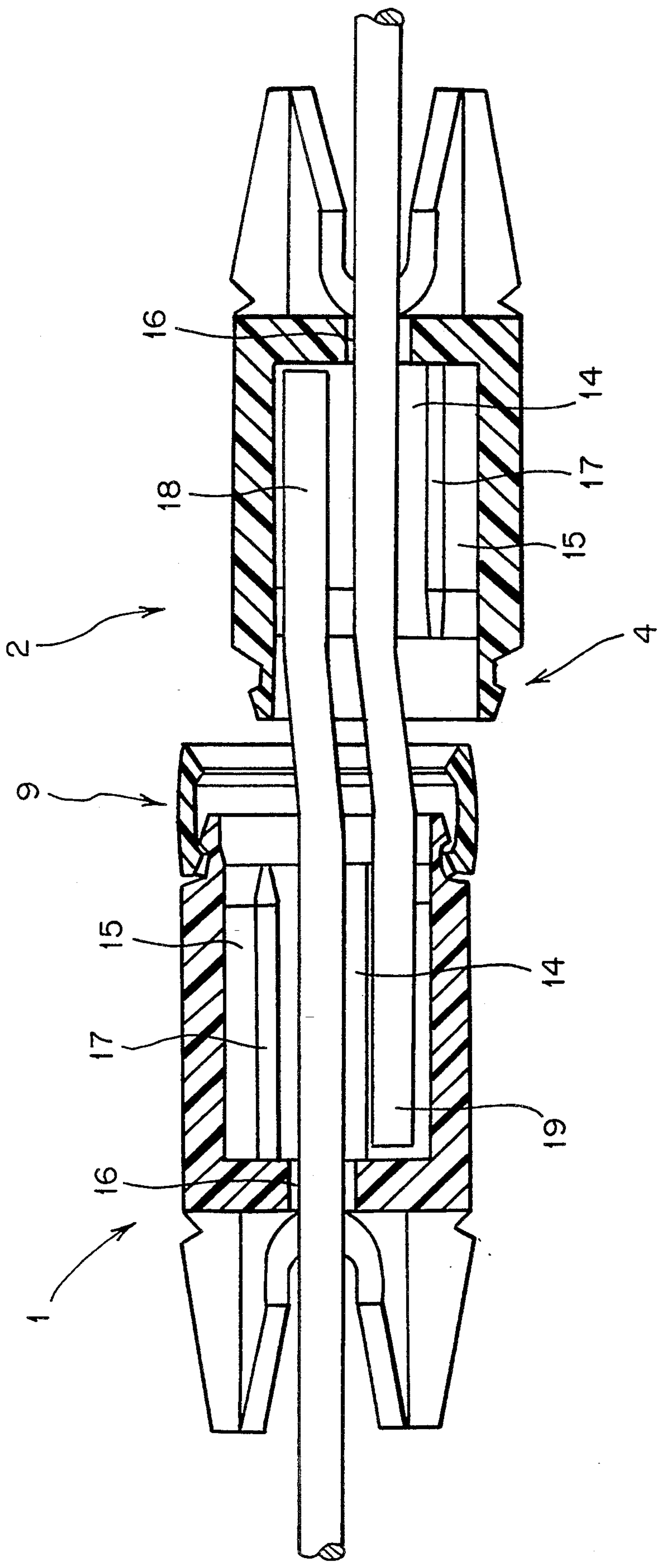
Figure 6:
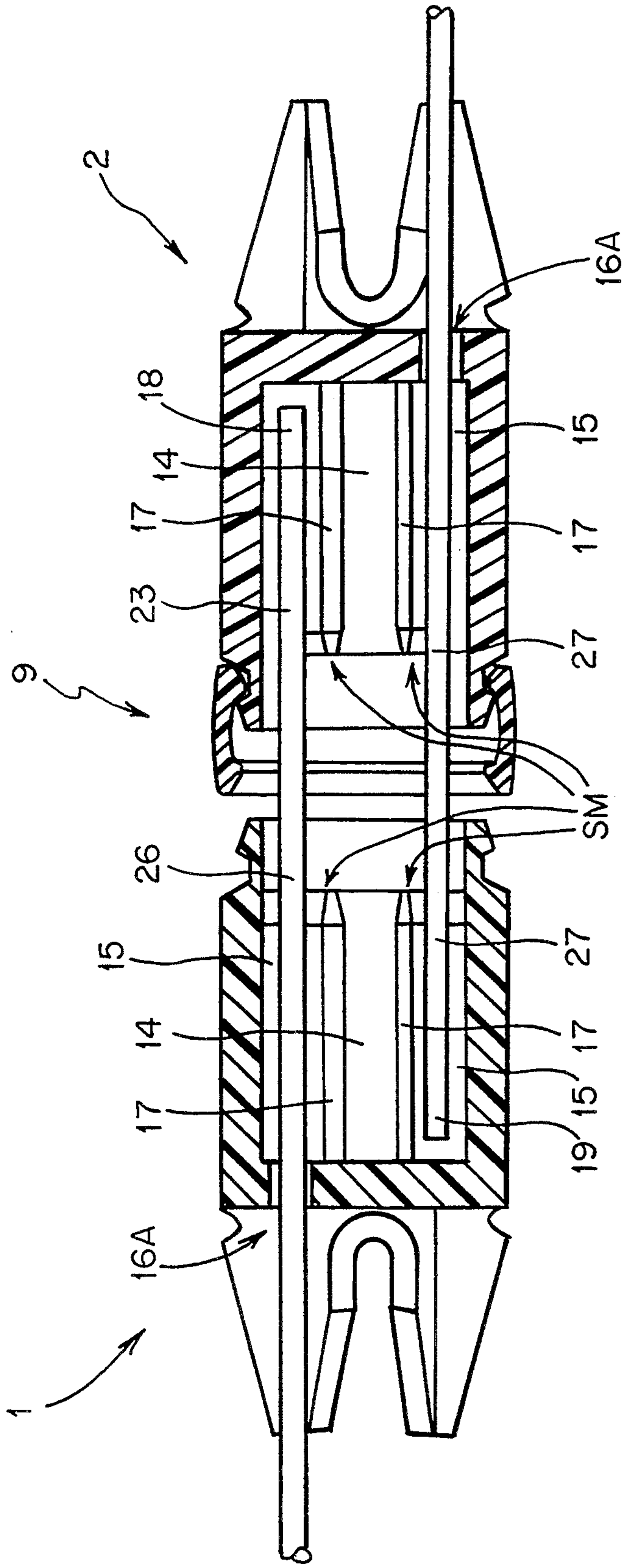
Figure 7:
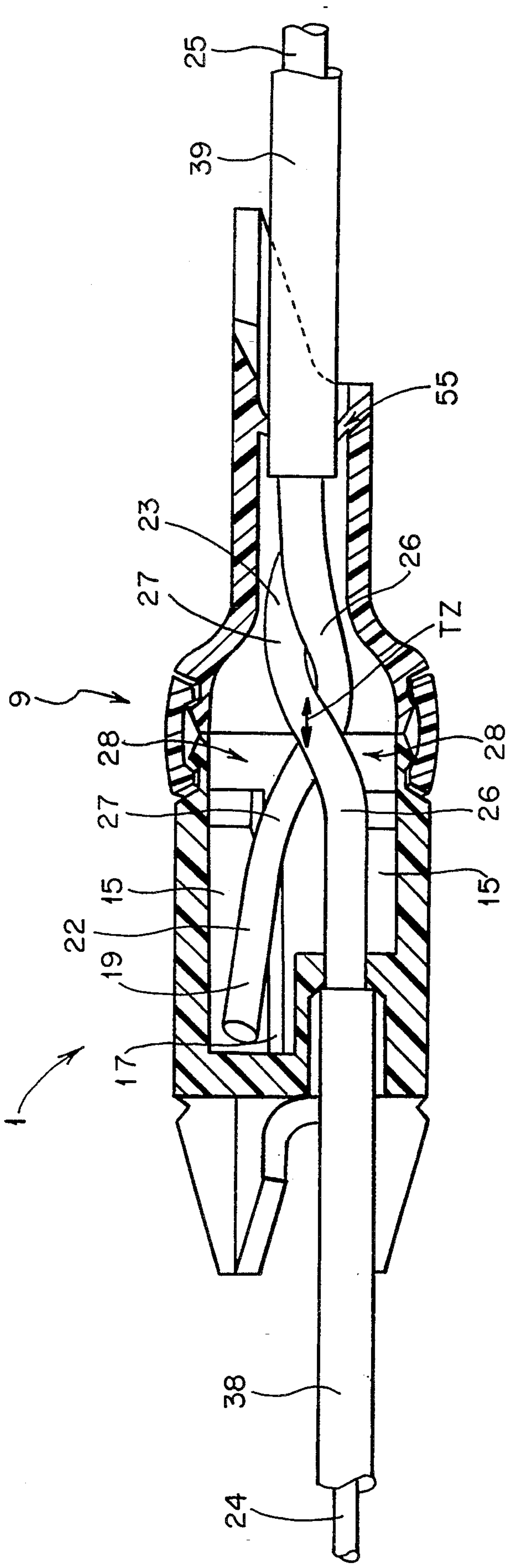
Figure 8:
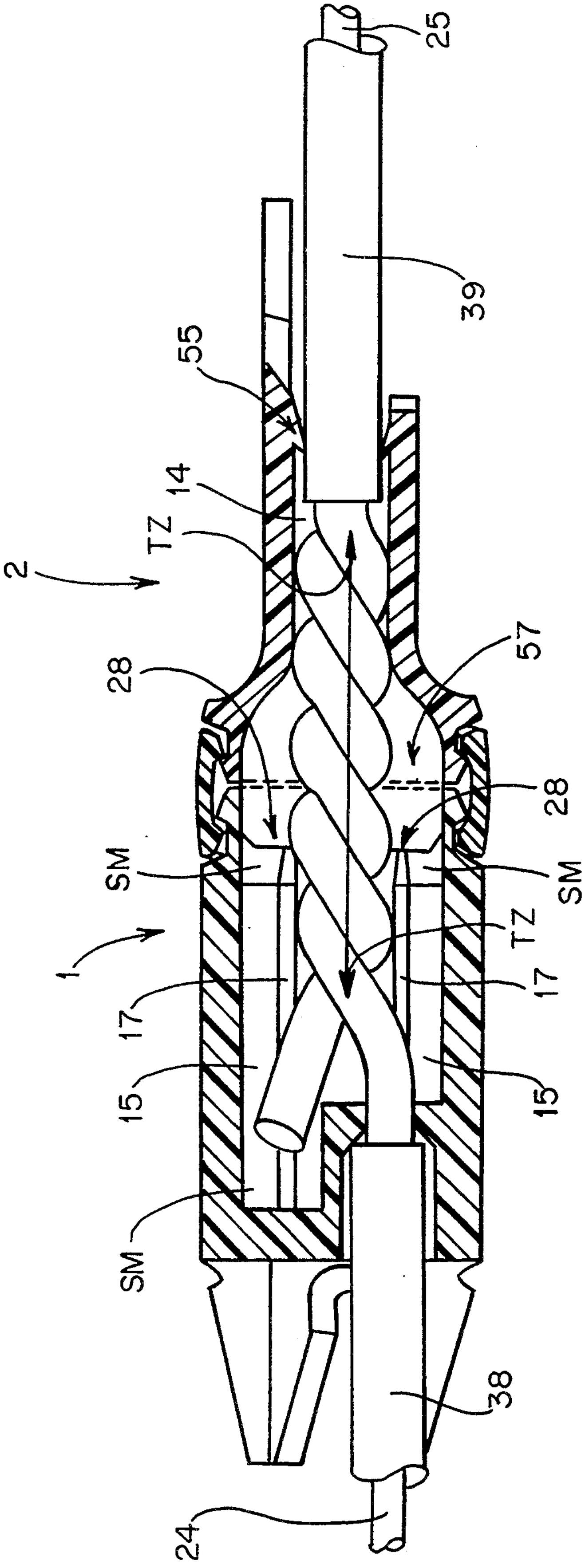
Figure 9:
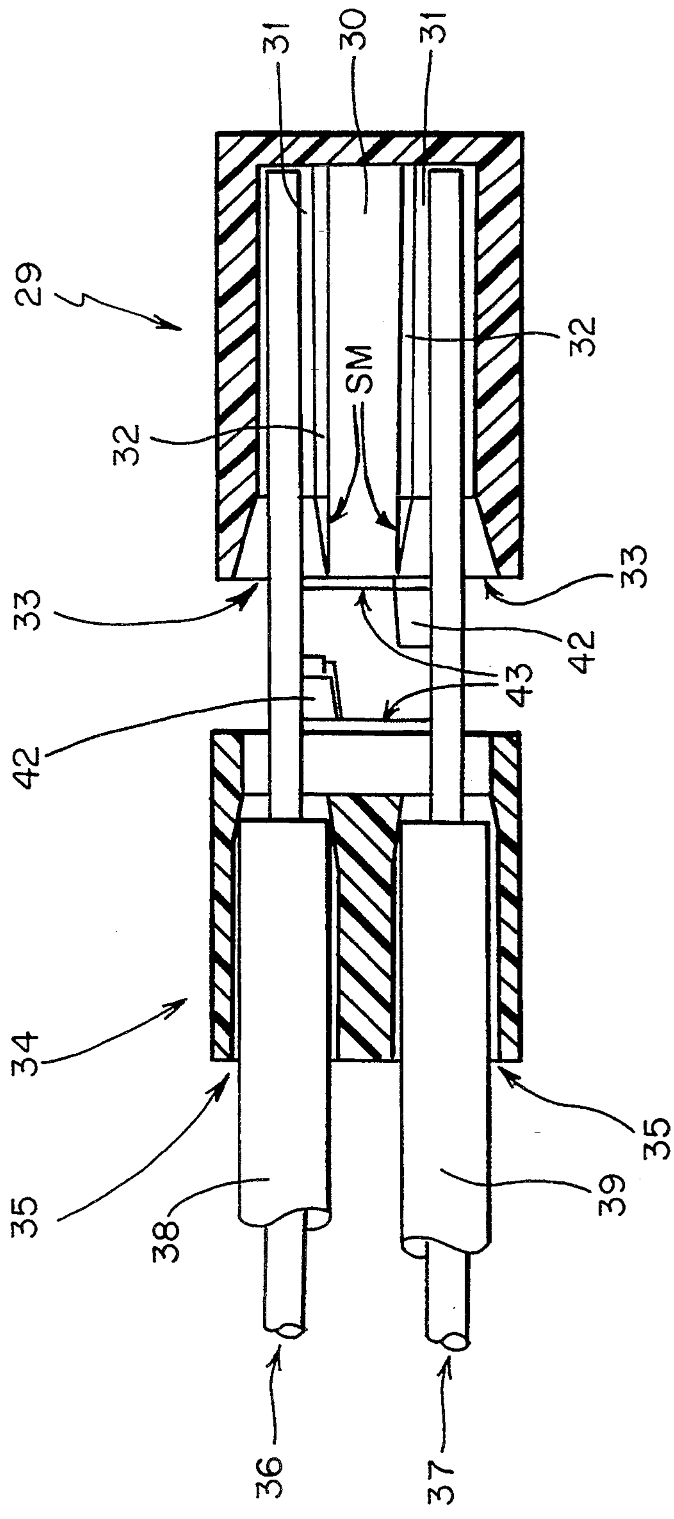
Figure 10:
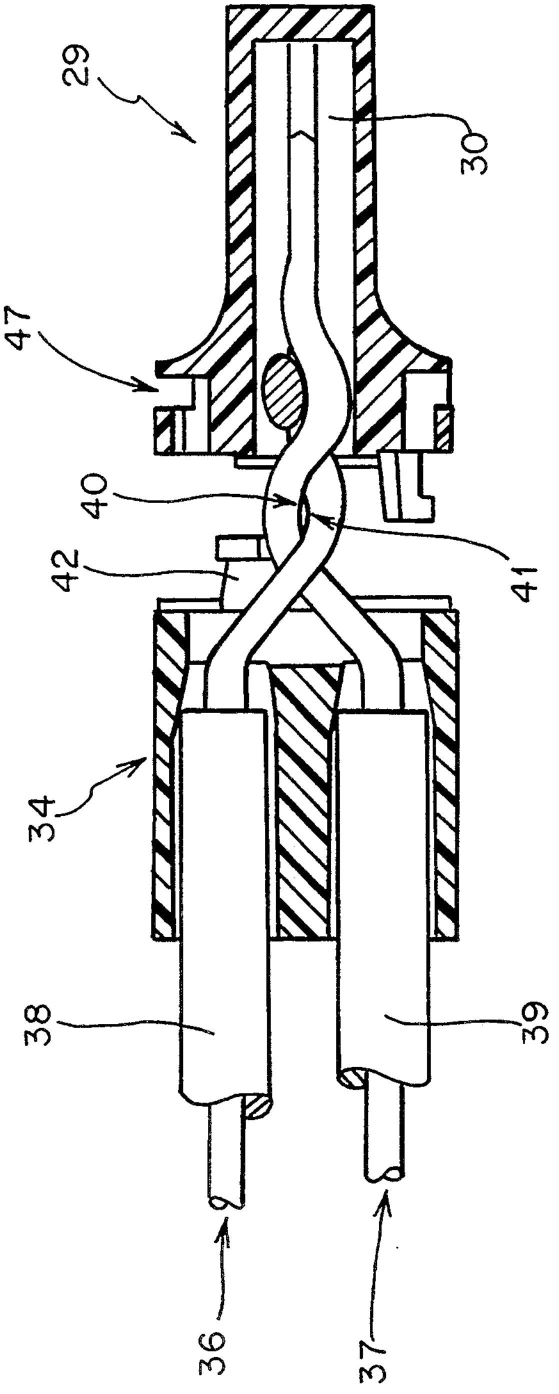
Figure 11:
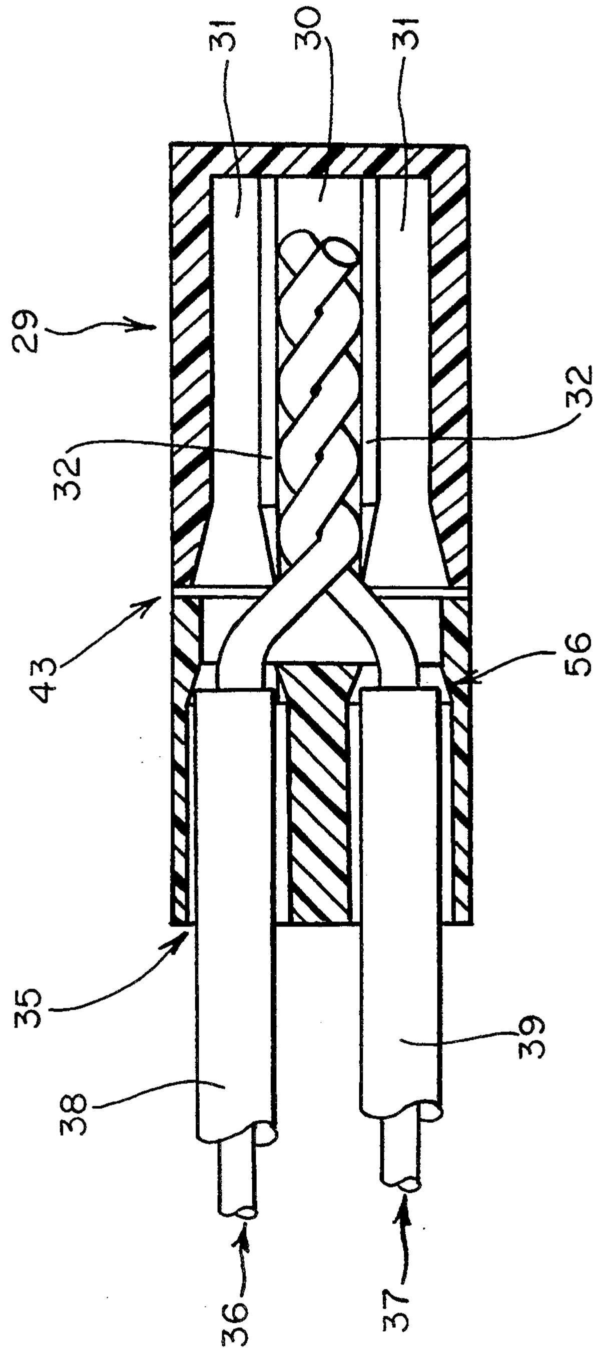
Figure 13:
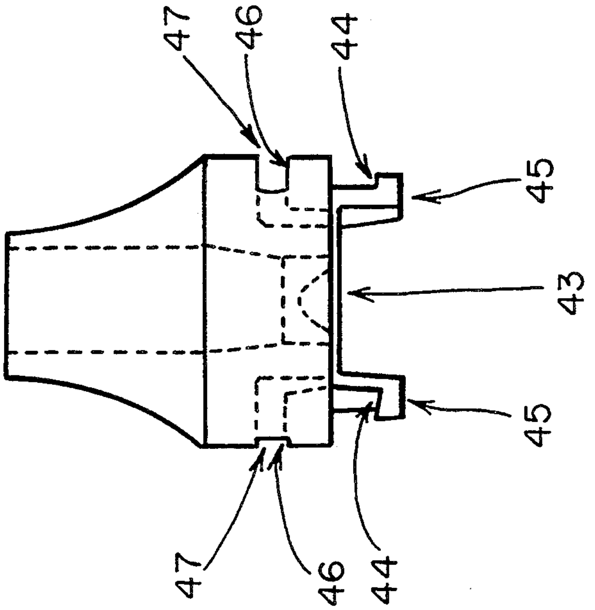
Figure 12:
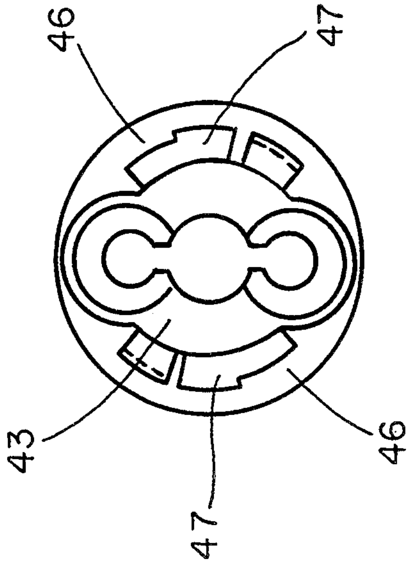

FIG. 4 is an enlarged view of the area circled in FIG. 1 which is the interconnection between one member of FIG. 1 and a sleeve whereby the members of FIG. 1 are coupled together, FIG. 5 is a sectional elevation of the members of the connector after the insertion of wires to be connected and prior to the assembly of the connector parts, FIG. 6 is a sectional elevation of members similar to those shown in FIG. 5 modified with respect to the positioning of the apertures whereby the wires to be connected enter the connector members, FIG. 7 is a view similar to FIG. 6 where the connector parts have been coupled and there has been an initial stage of a twist connection between the wires, FIG. 8 is a view similar to FIG. 6 where the twist connection is complete, FIG. 9 is a sectional elevation of the members of a dead end type connector according to the invention with the wires to be twist connected installed in the connector members, FIG. 10 is a view similar to FIG. 9 where the twist connection has been commenced, FIG. 11 is a view similar to FIG. 9 where the twist connection is complete, FIG. 12 is an end view of one of the members of the connector of FIG. 9 and FIG. 13 is an elevation of the connector member of FIG. 12.

The first embodiment of the invention is illustrated in FIGS. 1 to 8. The connector of the first embodiment comprises two identical members 1 and 2 each having a body 3 which is wider than it is thick and at one end of the body 3 there is a head 4 of circular cross-section having a collar 5 also of circular cross-section at the forward end thereof. The collar 5 has an annular front end face 6 with a conical face 7 extending outwardly and rearwardly from the end face 6 and terminating in an engagement shoulder 8, which is preferably angled rearwardly as shown.

The two members 1 and 2 are coupled by a sleeve 9 which is generally annular in shape with inwardly directed continuous ribs 10 inward of outwardly expanding conical contact faces 11. The internal diameter of the ribs 10 is less than the external diameter of the engagement shoulder 8 and thus there is an interference engagement between the inner faces 12 of the ribs 10 and the shoulders 8. To facilitate the engaging action of the faces 7 and 11 as the members 1 and 2 are pushed together with the sleeve 9 therebetween the sleeve 9 and/or the members 1 and 2 are made of a resiliently yieldable material. This enable a snap connection of the ribs 10 over the shoulders 8 to draw the ends 6 of the members 1 and 2 into abutting engagement. In an alternative arrangement the sleeve would be integral with one of the members 1 or 2 and would be profiled internally as just described to snap engage over the shoulder 8 of the other member.

The foregoing is the preferred form of engagement between the members collars and the sleeve as it forms a seal to prevent the ingress of moisture or corrosive agents which could affect the joint. The seal is formed by virtue of the residual forces within the expanded sleeve causing it to bear on the annular ridge 8, to form a high pressure low contact area along a narrow line of contact. Such that P=f/a, where "P" equals pressure, "f" equals force exerted and "a" equals the area on which the force is exerted. If "a" is small, the result of a narrow line of contact, the force is high and a good seal results. However an alternate arrangement may be used, for example forwardly of the collar 5 may be made up of a plurality of fingers to facilitate the snap connection, or the sleeve ends may be longitudinally slit to provide fingers, thereby to facilitate the snap connection.

The foregoing construction permits the relative rotation of the members 1 and 2 about an axis whilst the members 1 and 2 are connected as shown in FIG. 1. However, the relative rotation of the members 1 and 2 whilst interconnected is not essential for the performance of the method of the invention, as will hereinafter be described, and accordingly the collars and sleeve can be other than circular in shape.

In one embodiment of the invention where the members 1 and 2 are relatively rotatable whilst coupled by the sleeve 9 the faces 6 are provided with teeth to maintain the members 1 and 2 in a relative rotational position. This is represented by the teeth indicated 57 in FIG. 8. In a further arrangement the teeth are of ratchet type allowing only one direction of relative rotational movement of one member with respect to the other. The reason is to prevent the unwinding of a wire connection after its formation and to ensure the direction of rotation when joining multi-strand wires complements the original direction of helical wrap of the strands in the wire.

Internally the members 1 and 2 are substantially identical and include an elongated axial cavity means configured to have a central chamber 14 extending into the member from the inner end face 6 of the member, and two side chambers 15 connected to the central chamber 14 by slots 17 whereby the brake is applied against linear relative movement of wires during the formation of a twist connection. The cross-sectional size of the side chambers 15 is such as to prevent more than one wire being housed therein. The cross-sectional size of the central chamber 14 is sufficient to house the two wires to be twist connected after the formation of the twist connection.

Referring to FIG. 5, this illustrates the members 1 and 2 uncoupled and it is assumed that the "wires" to be joined are of single strand copper (or like) form. It will be noted that in FIG. 5 that wires 20 and 21 are entered into the connector members through end openings 16 to the central chamber 14 and that first portions 18 and 19 of the two wires 20 and 21 are housed respectively in the chambers 14 of the members 1 and 2.

In the FIG. 6 modified members there are no end openings 16 for the central chambers. One side chamber 15 of each member 1 and 2 has an end opening **16*a*. This allows the wires 20 and 21 to be entered respectively directly into the side chambers 15 having the openings 16*a* and the wire portions 18,19 can then be entered into the other (blind) side chambers 15 of the respective members 1 and 2. This results in an axial alignment of the members 1 and 2 whereas in FIG. 5 the members 1 and 2** are initially misaligned.

Referring to FIG. 7 it will be seen that the two members 1 and 2 have been coupled by the sleeve 9 and that wires 24 and 25 with insulation 38 and 39 have been substituted for the uninsulated wires 20 and 21 of FIGS. 5 and 6 to indicate that both insulated and uninsulated wires can be handled by the connector of the invention. In FIG. 7 there has been a slight relative rotation between the members 1 and 2 and the beginning of a double helical connection between the coupling portions 22 and 23 of the wires 24 and 25 has commenced.

The formation of a complete tight double helical connection involves the application of a brake to relative longitudinal movement between the wire portions 18 and 19 during the formation of the joint between the wires portions 22 and 23. The term "brake" as used herein is intended to mean a movement inhibiting force which can be overcome.

Initial contra-rotational movement of the members 1 and 2 applies a twisting torque to the wires. This causes first contact parts 26 and 27 of the wire portions 22 and 23, lying forward of the ends of the side chambers 15 in outwardly enlarging entry ends 28 of the side chambers 15, initially to come into contact with shoulder means SM on the enlarged entry ends 28. Thus there are two shoulder means at the entry end of each side chamber. As contra-rotation of the members commences one shoulder means of each side chamber will become a torque applying shoulder means and the other shoulder means of that side chamber will provide an opposing torque. For convenience hereinafter the shoulder providing the opposing torque will be referred to as a torque reaction shoulder means. The position of the shoulder means SM will changes during the formation of the connection as will now be explained.

There is a resistance by the wires to deformation needed to bring the wires into contact in a crossed relationship in the twist zone TZ. This resistance forces the wire portions 26 and 27 into the entry ends of the slots 17, which are tapered as a result of the intersection between the ends of the slots 17 and the flared or conical entry ends 28 of the side chambers 15. In a connector where the width of the slots 17 is greater than the diameter of the wires to be connected, the bend of the wires over the leading edges of the slots (the edges pushing against the wire during the contra-rotation) as the offset wires are drawn into the central axis of the contra-rotation (which is the axis of the helixes), will provide a braking friction to inhibit relative linear movement of the wires as they tend to withdraw from the side chambers to provide the material needed in the formation of the helixes in the twist zone TZ. The location of the shoulder means will move along the slot as the twist connection develops. See FIG. 8 where the final position for the shoulder means SM for the finished connection is indicated.

Where the slots 17 are narrower than the diameter of the wire in the side chamber the wire will bear against the tapered entry end of the slot 17 and in a wedge-like action there will be a braking friction created to inhibit relative linear movement of the wires as they tend to withdraw from the side chambers to provide the material needed in the formation of the helixes in the twist zone TZ. The frictional brake effect for the wide slot 17 discussed above is increased in the case of a narrower slot by the engagement of the wire by both sides of the slot and the yielding distortion of the slot sides as the wires are forced therebetween during the formation of the twist connection.

Thus, where the slot 17 is narrower than the diameter of the wire in the side chamber 15 there is a continuing frictional brake effect on the wires from the sides of the slots as the connection is formed.

Experimentation has shown that unless a braking effect is present during the twisting operation a twist of acceptable tightness and double helical form will not be achieved. As will be understood the nature of the material used to manufacture the connector members can have an effect on the frictional braking applied to the wires. As a result the width of the slots may need to be varied from material to material in order to maintain a required frictional braking effect. By way of example, a connector made from a material with "low" frictional drag characteristics will usually have a slot width less than is the case in a connector made from a material having a "greater" frictional drag characteristic.

It is to be noted that the description above in relation to FIGS. 7 and 8 shows the members 1 and 2. It is possible to form a twist connection as described with the members 1 and 2 not coupled by the sleeve 9 and subsequently to couple the members 1 and 2 by engaging them with the sleeve as hereinbefore described.

In a second embodiment of the invention for dead end connections, see FIGS. 9 to 13 two dissimilar members are provided. One member 29 has many features similar to the members 1 and 2. Specifically, there is provided a central chamber 30 (to act as a connection housing as did the central chamber 14 of members 1 and 2), the chamber 30 is blind ended and not a through hole as in members 1 and 2. There are two radially offset blind ended side chambers 31 (the equivalent of the side chambers 15 of members 1 and 2) and the chambers 30 and 31 are connected by slots 32 (the counterparts of the slots 17 of members 1 and 2). There are conical entry ends 33 to the side chambers 31 (the counterparts of entry ends 28 of the side chambers 15 of members 1 and 2) and shoulder means (SM) at the entry of each side chamber 31 and tapered entry ends to the slots 32. The other member 34 has two through holes 35 adapted to house insulated wires with cores 36,37 and insulation 38,39. The spacing of the holes 35 is the same as the spacing apart of the side chambers 31 of the member 29.

In a connection forming sequence (see FIG. 10), initial contra-rotation of the members 29,34 results in the contact parts 40,41 of the wires engaging the shoulder means SM and the wires 36,37 enter into the tapered entry ends of the slots 32. During the formation of the connection there will be a frictional braking effect as previously described. The contra-rotation is continued with the progression of the contact parts 40,41 of the wires along the slots 32. The end result is a tightly conjoined wire pair in the form of a dead end double helical connection housed in the central chamber 30 of the member 29.

After completing the twist connection the members 29,34 are united in face to face contact by means of headed lugs 42 on both members. The heads of the lugs may be profiled to suit co-operative engagement with corresponding surfaces upon each member, in either a snap connection or by a cammed bayonet connection. With reference to FIGS. 9 to 13 the headed lugs illustrated are intended to perform the bayonet type connection referred to, whereby a tight engagement of the raised lands 43 is accomplished by passing the headed lugs 42 of the respective members 29,34 through respective apertures 47 in opposing members. This brings the lands 43 of opposed members 29,34 into radially misaligned face to face contact. Contra-rotating the members 29,34 (30 degrees as illustrated), simultaneously aligns the lands 43 whilst forcing them into tight engagement by virtue of the reaction between correspondingly profiled camming surfaces, being respectively, the inner edges 44 of the elevated head portions 45 of the headed lugs 42, and the rearwardly facing outwardly disposed surfaces 46 in the apertures 47.

Alternatively, the members may be provided with a collar and sleeve arrangement as provided for the embodiment of FIG. 1.

Although herein described as being of different form it is to be understood that the members 29 and 34 can both be of the member 29 form, with side chambers 31 of at least one of the members having end openings to allow the wires to pass therethrough into the side chambers 31 of the other member.

Figure 2:
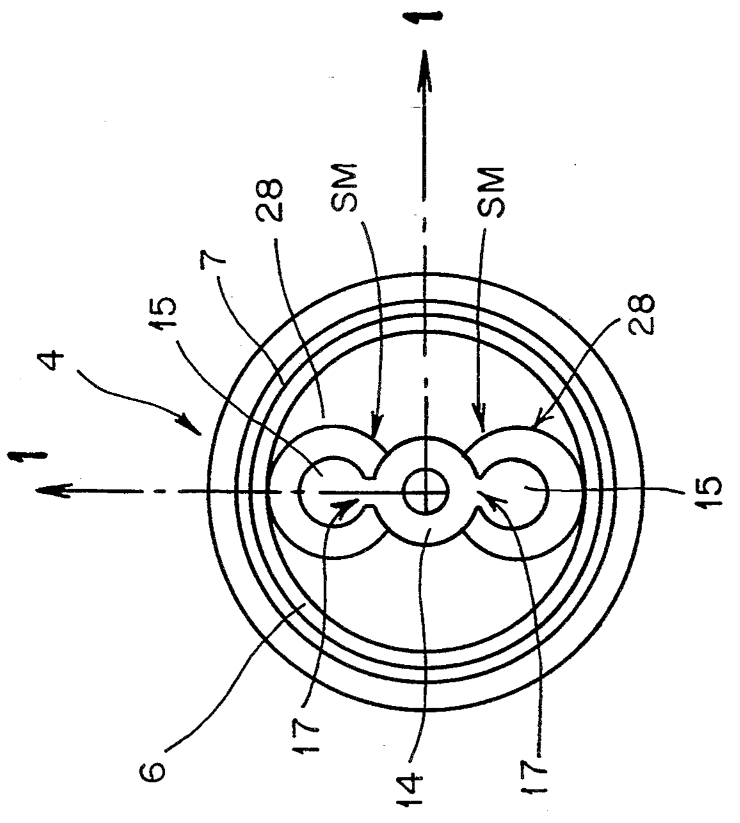
FIG. 2 is an end view of one of the members of FIG. 1 viewed in the direction of the arrow A.

Other features of the members 1 and 2 which facilitate the use of the connector include an insulation stripper for insulated electrical wires, see FIGS. 1 and 2. It comprises an end extension 50 of the members 1 and 2 preferably coupled thereto by a frangible zone 51. The extension has a slot 52 therealong and a tapered entry 53 to the slot. The edges of the slot 52 and entry 53 are angled to provide a cutting edge 54. The slot 52 ideally is slightly greater in width than the diameter of the conductor of the wire and the tapered entry 53 has a maximum width greater than the diameter of the insulation. The procedure is to place the wire with the required length to be stripped above the extension 50 and then force the insulated wire into and through the tapered entry 53 into the slot 52 preferably with a part or full rotation to cause the cutting edge to sever the insulation. Then by holding the wire and pulling the member 1 away from the wire the severed insulation is stripped from the conductor leaving it bared for insertion into its channel in the member 1. If desired the wire can be inserted into the slots of the extensions of two oppositely opposed relatively inverted members 1 and 2 and then by pulling the members apart the stripping is effected. Either form of stripping can be adopted. Subsequently, the extensions 50 can be broken off, if desired.

As a further and preferred feature of the invention it is desirable to seal the chamber 14 around the wire passing therethrough. In FIGS. 7 and 8 there is shown an inwardly and forwardly projecting annular sealing lip 55 which will, as can be readily understood, embrace an insulated wire passing through the chamber 14. The forward angle of the lip 55 facilitates the passage of the insulated wire through the chamber 14.

An alternative rear chamber seal arrangement is illustrated in FIG. 11 where there is provided a gradual tapered zone 56 into which the insulation around the wire cores 36 and 37 is pushed as far as it will go when mounting the wire in the hole 35. Thereafter the formation of the helical connection drags the insulated tightly into the tapered zone 56 to form a seal which substantially resists water penetration.

For electrical conductors the connector members would desirably be moulded from an insulating material such as ceramic of plastics material having appropriate heat and electrical insulation properties. The material should also be sufficiently hard to allow the cutting edges of the slot and entry thereto, 52,53 to sever the insulation around a conductor.

Where the members are required resiliently to yield, as where the slots joining the side chambers and the central chamber of the member cavity is narrower than the diameter of the wire housed in the wire chamber, a suitable plastics material would be used. A suitable material would be glass filled PET, such as DuPont "Rynite" (trade mark) grade FR530 and FR515.

It will be clear from the several embodiments described that the connectors can have more multiple side chambers associated with the central chamber 14 in order to join more than two wires in one connection.

I claim:

1. A connector for forming a twist connection between two ductile wires, said connector comprising:

two members with each of said members having elongated cavity means, said cavity means of each said member including a pair of transversely spaced wire chambers with access to the wire chambers of both of said members from inner ends of said members, said cavity means of at least a first member of said members including an associated central chamber disposed between, and connected by, a slot to both of the associated wire chambers of said one member with access to each central chamber from the inner end of said members, access to the cavity means of at least a second member of said members from an outer end of said second member, the cross-sectional area of each wire chamber being such that two wires to be joined cannot simultaneously occupy a wire chamber, the cross-sectional area of each central chamber being such that two twist connected wires are able to be housed therein;

brake surface means on sides of said slots;

torque applying shoulder means and torque reaction shoulder means in the cavity means of both of said members adjacent the inner ends of said members; and, means for coupling said members together with the inner ends thereof in an adjacent relationship.

2. A connector as claimed in claim 1, wherein both of said members have cavity means with wire chambers and a central chamber with slots between respective wire chambers and said central chamber, adjacent thereto, and brake surface means on the sides of said slots, an inwardly convergent enlarged entry zone for each wire chamber extending into the wire chamber from the inner end of said member, angled sides for a portion of each of said slots adjacent the inner ends of said members with the angled slot sides divergent toward the inner end of said member and formed by an intersection of the slots with the enlarged entry zone of the wire chambers.

3. A connector as claimed in claim 1 where each of said slots has a width which approximates but is narrower than the diameter of the wire housed in the adjacent wire chamber and the members are made from a resiliently yieldable plastics material.

4. A connector as claimed in claim 1 including releasable coupling means whereby the two members are coupled together with the inner ends of the members in substantially abutting engagement.

5. A connector as claimed in claim 4 where the coupling means includes a sleeve connecting the members together and releaseable catch means allowing at least one member to be disconnected from the sleeve.

6. A connector as claimed in claim 5 with a collar on the inner end of one member, upstanding external first catch means on the collar, a coupling sleeve mounted on the other member, and internal second catch means in the collar for releasable connection with the first catch means.

7. A connector as claimed in claim 5 with a collar on the inner end of each member, upstanding external first catch means on the collars, a coupling sleeve, internal second catch means in the collar for releasable connection with the first catch means of both collars.

8. A connector as claimed in claim 4 including interengageable projections on the inner ends of the members to lock coupled members in a predetermined rotational relationship.

9. A connector as claimed in claim 4 including interengageable projections on the inner ends of the members shaped to permit contra-rotation of coupled members in a first direction but prevent contra-rotation in the opposite direction.

10. A connector as claimed in claim 1 where said members at their first ends are respectively provided with fingers with latch lugs and openings with cooperating ramped latch faces so that insertion of said fingers in said openings followed by partial relative rotation of the members will cause engagement of said latch lugs with said latch faces in a camming action pulling the inner ends of said members into abutting relationship.

11. A connector as claimed in claim 10 including sealing surfaces surrounding the cavity means access from said inner ends of said members and said surfaces are forced into contact by said camming action.

12. A connector as claimed in claim 11 where the sealing surface on the first end of at least one of said members is a continuous raised land.

13. A connector as claimed in claim 1 including an insulation cutter-stripper comprising a pair of fingers forming a notch with a spacing between first finger portions adjacent a closed end of said notch which is substantially equal to but no less than the diameter of the wire to be mounted in the wire chamber of the connector and a spacing between further finger portions extending divergently away from said first finger portions to free ends of said fingers remote from said notch closed end, cutting profiles on facing edges of said fingers whereby insulated wires forced between said fingers into the space between said first finger portions and rotated will have the insulation circumferentially severed.

14. A connector as claimed in claim 13 wherein said insulation cutter is frangibly connected to its associated member.

15. A connector as claimed in claim 1 including a resilient seal to sealingly embrace a wire entered into one of said cavity means from an outer end of a connector member.

16. A method of forming a twist connection between two ductile wires, the method comprising the steps of:

providing a connector comprised of two members where:

(a) each member has wire receiving cavity means to receive wires to be connected in side by side relationship, (b) each member has torque applying shoulder means in each cavity means, (c) each member has torque reaction shoulder means in each cavity means, (d) at least one member has brake surface means associated with its cavity means, contra-rotating the members with wires positioned in the cavity means of both members whilst maintaining the members in a fixed spaced relationship with the cavity means of the members axially aligned to cause said wires sequentially:

(i) to be contacted by said torque applying shoulder means and to be forced into contact with said torque reaction shoulder means, (ii) to cross and engage with each other (iii) to be braked against relative linear movement during said contra-rotation by forced engagement with said brake surface means, (iv) to twist each about the other to form a twist connection of interlocking helixes.

* * * * *